US006455973B1

(12) United States Patent
Ineson et al.

(10) Patent No.: US 6,455,973 B1
(45) Date of Patent: Sep. 24, 2002

(54) MAGNETIC DEVICE WITH FLUX RETURN STRIP

(75) Inventors: David J. Ineson, Oakville; William Loxsom, Stratford, both of CT (US); Alois Christiaens, Kerselarenlaan 52 (BE)

(73) Assignee: Siemens VDO Automotive Corp., Auburn Hills, MI (US)

( * ) Notice: Subject to any disclaimer, the term of this patent is extended or adjusted under 35 U.S.C. 154(b) by 0 days.

(21) Appl. No.: 09/240,135

(22) Filed: Jan. 29, 1999

(51) Int. Cl.[7] .............................................. H02K 1/00
(52) U.S. Cl. ...................... 310/190; 310/89; 310/216; 310/256; 310/259; 310/43; 310/112; 310/218; 310/258
(58) Field of Search ..................... 310/190, 89, 216, 310/256, 259, 43, 258, 179, 254, 218, 112

(56) References Cited

U.S. PATENT DOCUMENTS

| | | | |
|---|---|---|---|
| 2,070,447 A | 2/1937 | Morrill | 172/278 |
| 3,021,443 A | * 2/1962 | Tamm | 310/190 |
| 3,092,743 A | 6/1963 | Van Utt et al. | 310/162 |
| 3,411,059 A | 11/1968 | Kaiwa | 318/138 |
| 3,508,091 A | 4/1970 | Kavanaugh | 310/49 |
| 3,746,900 A | 7/1973 | Morley | 310/41 |
| 3,888,553 A | 6/1975 | Wehde | 308/10 |
| 3,992,641 A | * 11/1976 | Heinrich et al. | 310/168 |
| 4,156,817 A | * 5/1979 | Preece et al. | 290/38 R |
| 4,220,899 A | * 9/1980 | Heide | 318/135 |
| 4,268,769 A | 5/1981 | Dorner et al. | 310/67 R |
| 4,333,026 A | 6/1982 | Bock et al. | |
| 4,545,209 A | 10/1985 | Young | 62/6 |
| 4,593,222 A | * 6/1986 | Burkel et al. | 310/254 |
| 4,723,754 A | 2/1988 | Torimoto et al. | |
| 4,754,183 A | 6/1988 | Gerber | 310/156 |
| 4,884,000 A | * 11/1989 | Muller | 310/268 |
| 4,900,965 A | 2/1990 | Fisher | 310/216 |
| 5,053,667 A | * 10/1991 | Oudet | 310/268 |
| 5,243,248 A | 9/1993 | Benford | 310/256 |
| 5,256,926 A | 10/1993 | Hagenlocher et al. | 310/259 |
| 5,298,822 A | * 3/1994 | Bosman et al. | 310/49 R |
| 5,567,998 A | 10/1996 | Ineson et al. | 310/90 |
| 5,747,897 A | 5/1998 | Iwasa et al. | |

FOREIGN PATENT DOCUMENTS

| | | |
|---|---|---|
| JP | 62193530 | 8/1987 |
| JP | 08014018 | 1/1996 |
| JP | 08021556 | 1/1996 |
| JP | 08296758 | 11/1996 |

* cited by examiner

*Primary Examiner*—Nestor Ramirez
*Assistant Examiner*—Thanh Lam

(57) ABSTRACT

A magnetic device having a stator assembly having a magnetic flux return path comprising at least a pair of pole plates located a fixed distance apart from each other and at least one flux return strip pressed between each pair of spaced apart pole plates, and a rotor assembly having permanent magnetic material and being disposed for rotation relative to the stator assembly. Use of the flux return strip eliminates the need for a housing of ferrous material to complete the flux return path and facilitates flexible design of light-weight non-metallic housings and mounting systems or integral mounting to mating components.

9 Claims, 6 Drawing Sheets

MAGNETIC DEVICE WITH FLUX RETURN STRIP

BACKGROUND OF THE INVENTION

1. Field of the Invention

The present invention generally relates to devices employing magnetic flux return paths such as electric motors. More particularly, the invention relates to magnetic devices having at least one flux return strip pressed between pole plates to complete a magnetic flux path or circuit. In another aspect of the invention, use of the flux return strips eliminates the need for a metal housing of ferrous material to complete the flux return path. This facilitates flexible design of light-weight mounting systems or integral mounting of the magnetic devices to mating components in product assemblies.

2. Discussion of the Prior Art

Magnetic devices of varying designs, such as the many forms of electric motors, are well known and frequently used for linear or rotating actuation in a myriad of products. The motors commonly use a magnetic flux return path about their periphery that incorporates ferrous material.

Many motors, such as the design shown in U.S. Pat. No. 5,567,998, use a ferrous metal motor housing that contacts pole plates at their outer radial edges to complete the flux return path while additionally serving as a protective barrier against contamination by environmental elements. It has been suggested in U.S. Pat. No. 5,243,248, that an improved motor design may include a flux return path formed by utilizing discrete windings of magnetic material wire surrounding the field windings of the motor. Still other motors have been manually assembled as a stacked assembly of loose components with rings of ferrous material placed between pairs of pole plates. A spring element was included in such motors to compress the stacked assembly within an outer metal housing to ensure good contact between components.

Motors that utilize radial pole plates and a ferrous metal outer housing for the magnetic flux return path have several disadvantages. First, it is difficult to achieve consistent contact between the outer edges of the pole plates and the housing. The housing must receive the pole plates or be formed around them. However, air gaps between the pole plates and housing decrease the efficiency of the flux return path and consequently, the performance of the motor. Therefore, to minimize air gaps between the inner wall of the housing and the outer edges of the pole plates, the housing must be crimped or otherwise put in tension to squeeze the pole plates. Moreover, the ability to maintain consistent contact between the pole plates and housing is jeopardized in motors subjected to thermal cycling due to the expansion and contraction of the housing.

Second, a flux return path formed by a ferrous metal housing which encloses the entirety of a motor or by windings of magnetic wire around a motor's periphery often significantly adds to the mass of the motor. Motors, in turn, are usually mounted to other components to form assembled products. Therefore, greater motor mass directly contributes undesirable added mass to the overall product.

Third, greater motor mass often has disadvantageous secondary effects. In general, a heavier motor requires a mounting system of greater strength, and consequently of greater mass and potentially of greater complexity. It is common for motors having a ferrous metal housing, such as that shown in U.S. Pat. No. 5,567,998, to have some form of a metal mounting flange to permit attachment of the motor to other components of an assembled product. The metal mounting flange must be formed into or be attached to the housing, and appropriate fasteners are required. Thus, the additional mass of a ferrous metal housing also may indirectly contribute undesirable added mass and complexity to the overall product.

For motors that may have used discrete windings of magnetic material wire, such windings may contribute not only significant undesirable mass to the product, but also may require the added complexity of further winding operations.

Motors that may have used a manually assembled stack of pole plates with flux return rings therebetween would require some additional means of holding the assembly in compression to promote contact between the flux carrying elements. This necessarily involves additional components, such as a spring, and requires some additional structure, even if it is the housing itself, to contain and hold the assembly in compression. Such additions result in undesirable added mass and complexity in the construction of the motor.

In light of the shortcomings and undesirable features commonly found in magnetic devices such as electric motor constructions, it is desirable to have a relatively simple construction having a highly efficient magnetic flux return path that has at least a pair of pole plates located a fixed distance from each other and that such device have at least one flux return strip pressed between each pair of pole plates so as to maintain consistent contact between the flux return strip and the pole plates. It further is desirable that the cross-section of such flux return strip include an arcuate portion. It also is desirable to eliminate the ferrous motor housing and to have the electrical connector for the motor be adapted for integral mounting of the motor to a product assembly. Alternatively, it is desirable to have the motor include a light-weight plastic motor housing. It would be further advantageous to have the plastic motor housing adapted for mounting to a product assembly. The present invention overcomes disadvantages of prior motors, while providing the above-mentioned desirable features.

SUMMARY OF THE INVENTION

The purpose and advantages of the invention will be set forth in and apparent from the description and drawings that follow, as well as will be learned by practice of the invention disclosed and claimed herein.

The present invention is generally embodied in an improved magnetic device. In accordance with one aspect of the invention, the magnetic device comprises a stator assembly having a magnetic flux return path comprising at least a pair of pole plates located a fixed distance apart from each other and at least one flux return strip pressed between each pair of spaced apart pole plates. The magnetic device further has a rotor assembly having permanent magnetic material and being disposed for rotation relative to the stator assembly.

In a further aspect of the invention, the stator assembly is constructed with the pole plates over-molded into the stator and each flux return strip is pressed between a pair of the spaced apart pole plates and formed around the stator assembly.

In accordance with another aspect of the invention, the cross-section of each flux return strip includes an arcuate portion. The width of the cross-section of each flux return strip is increased when the strip is formed around the stator assembly.

In a still further aspect of the invention, the magnetic device further comprises an electrical connector having integral mounting flanges and the stator and rotor assemblies extend substantially forward of the electrical connector.

In another aspect of the invention, the magnetic device in combination with a mating component further comprises an electrical connector having integral mounting flanges for mounting the stator and rotor assemblies within a bore of the mating component.

In yet another aspect of the invention, the magnetic device has a non-ferrous housing disposed substantially around the stator and rotor assemblies, and having a seal that engages the electrical connector and the housing.

BRIEF DESCRIPTION OF THE DRAWINGS

In describing the preferred embodiments, reference is made to the accompanying drawings wherein like parts have like reference numerals, and wherein.

It should be understood that the drawings are not to scale. It should also be understood that, as discussed below, the present invention is not limited to the preferred embodiments illustrated.

DETAILED DESCRIPTION OF THE PRESENTLY PREFERRED EMBODIMENTS

Before turning to the preferred embodiments, it should be understood that the present invention may take many forms in a variety of devices employing a magnetic flux return path. For illustrative purposes, throughout the following discussion the invention is described as it is incorporated into a particular magnetic device used in a specific product assembly, namely an electric motor 10 in the form of a stepper motor that provides linear actuation for an idle air control valve assembly. However, the invention is equally applicable to other magnetic devices that employ a flux return path.

Figure 1:
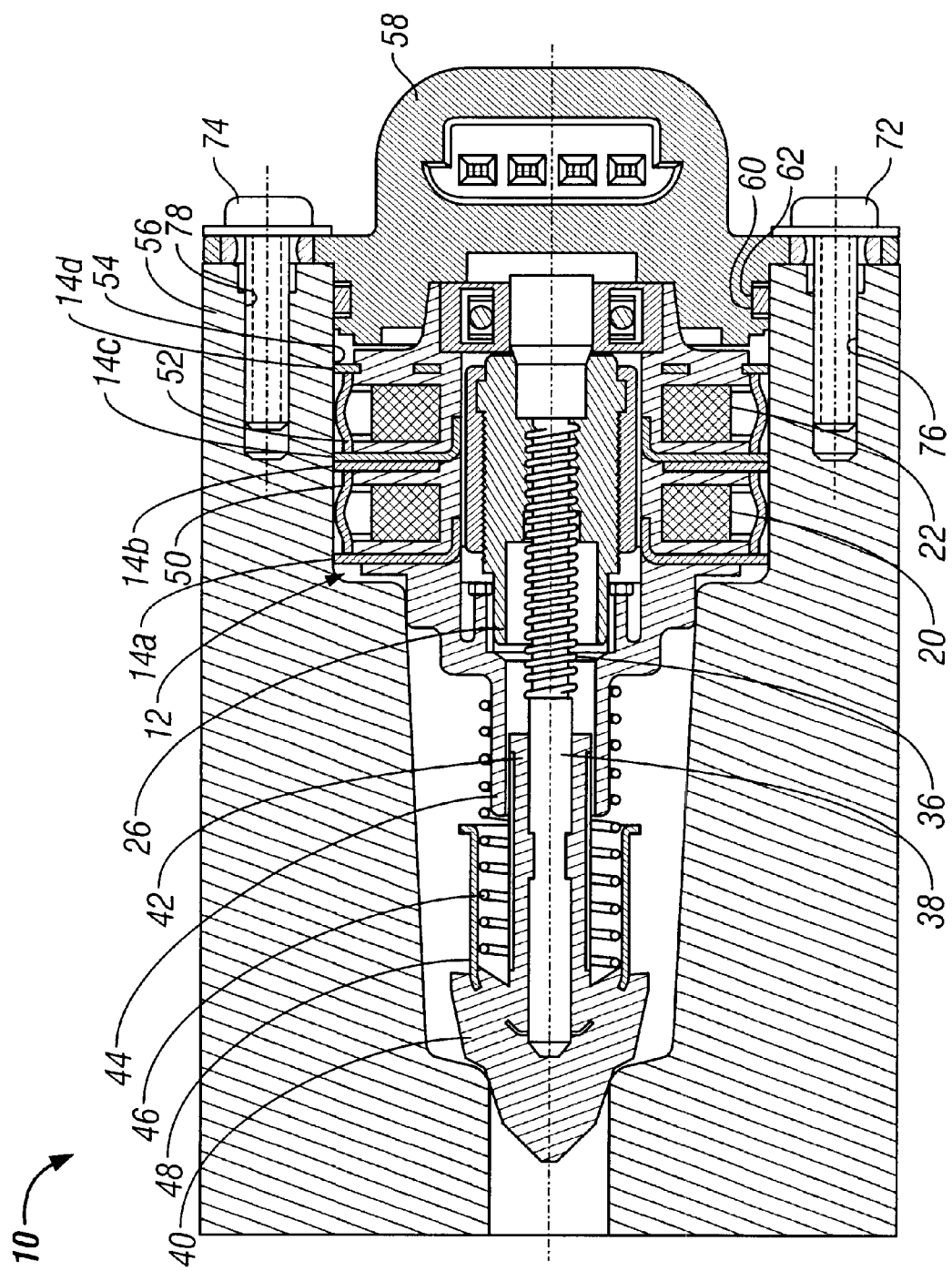
FIG. 1 is a longitudinal sectional view of an embodiment of an electric motor incorporating flux return strips and an electrical connector having integral mounting flanges for mounting of the motor within a bore of a mating component.
Figure 2:
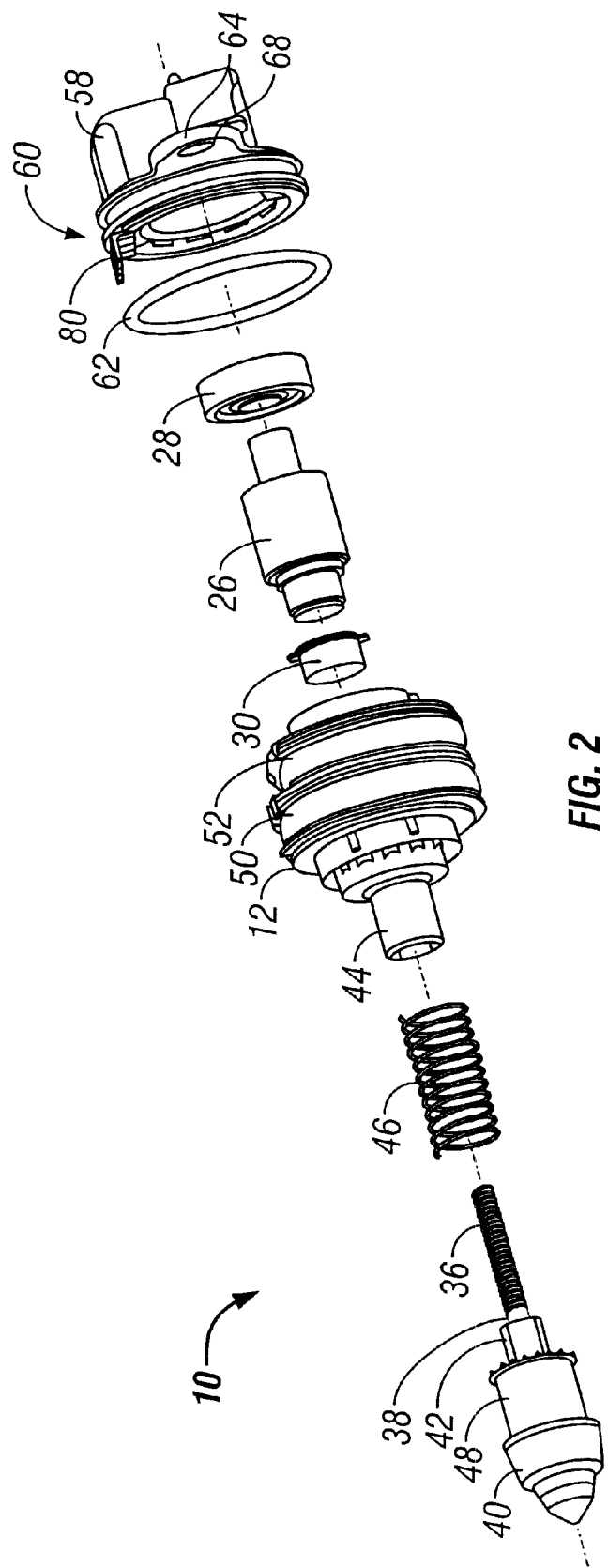
FIG. 2 is an exploded front perspective view of the electric motor shown in FIG. 1.
Figure 3:
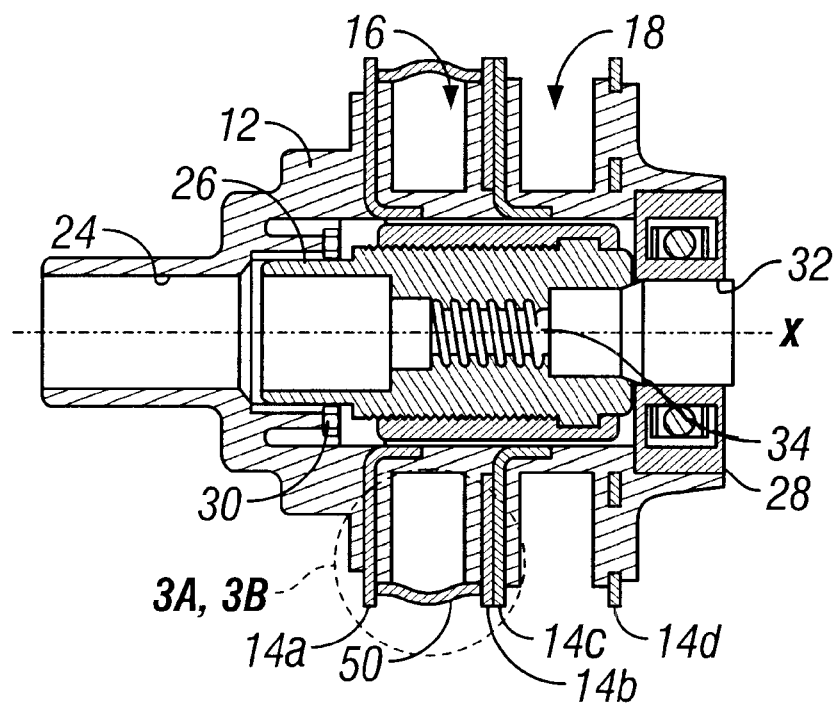
FIG. 3 is a longitudinal sectional view of the stator and rotor assemblies of FIGS. 1 and 2 with one flux return strip installed, and with FIGS. 3a and 3b providing enlargements of a circled area shown in FIG. 3 to illustrate sectional views of two further flux return strip configurations.
Figure 4:
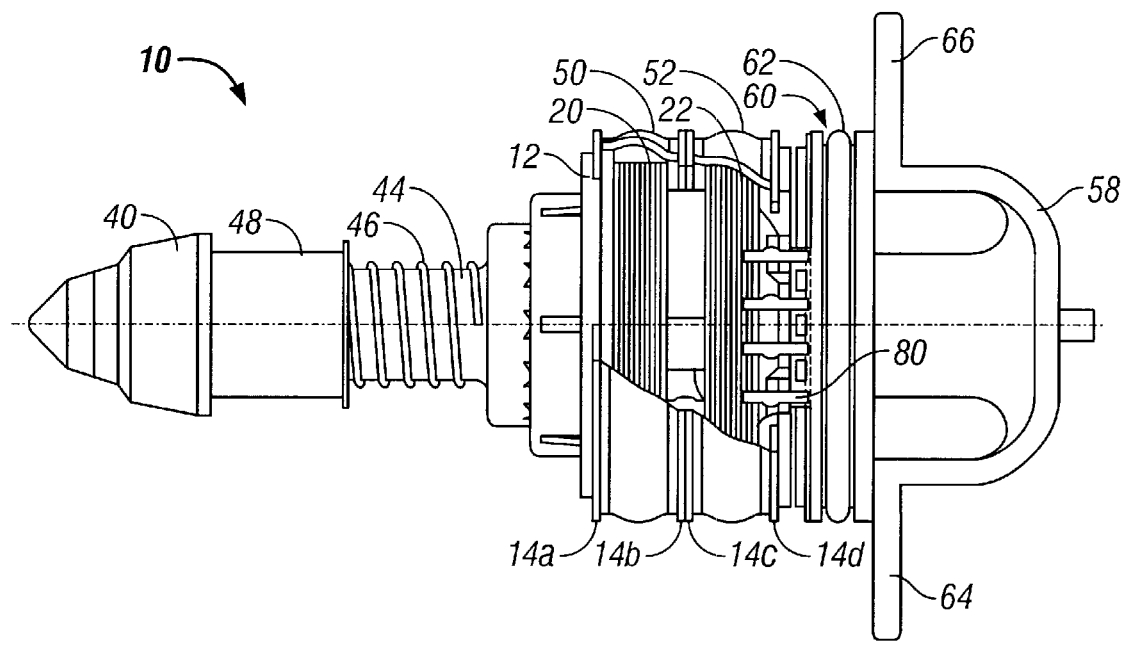
FIG. 4 is a top view of the electric motor shown in FIGS. 1 and 2.
Figure 5:
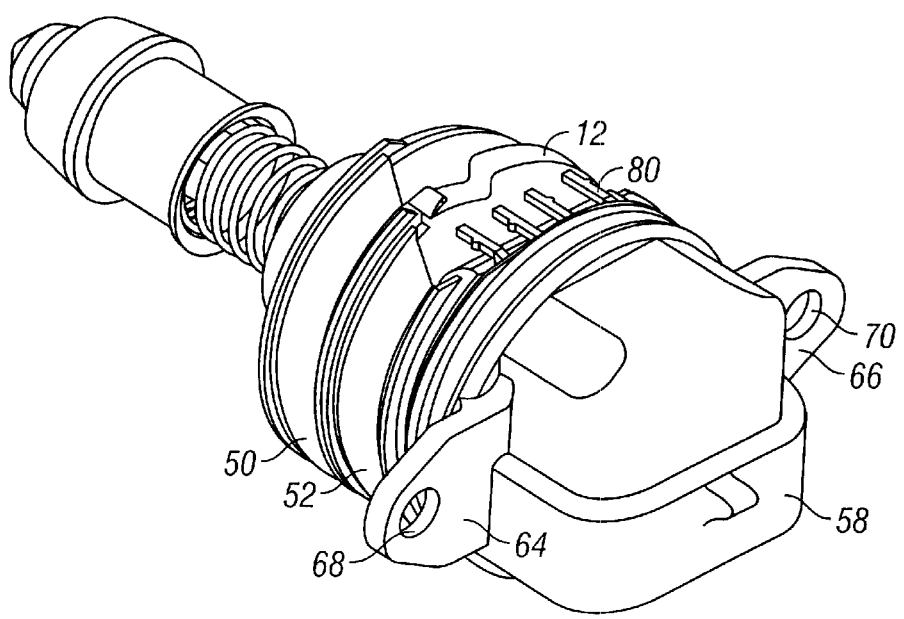
FIG. 5 is a rear perspective view of the electric motor shown in FIGS. 1, 2 and 4.

Turning now to the drawings and referring to FIGS. 1–5, the motor 10 includes a monolithically-molded stator assembly 12. As best seen in FIG. 3, the stator assembly 12 is formed by injection molding plastic material, such as polybutylene terephthalate or other suitable material, around a plurality of pole plates 14a, 14b, 14c, and 14d. The stator assembly 12 could be otherwise constructed to hold the pole plates in a fixed position, such as by use of fasteners or setting compounds. The pole plates 14a through 14d are typically constructed of low carbon steel, such as AISI 1008 or 1010 steel or other suitable ferrous material, and are arranged in pairs. In this embodiment, the pole plates 14a through 14d are over-molded in adjacent spaced apart pairs, 14a–14b and 14c–14d and, as best seen in FIGS. 4 and 5, the pole plates are not completely circular at their radial edge. The stator assembly 12 includes wells 16, 18 in the plastic located between the respective pairs of pole plates 14a–14b and 14c–14d. The wells 16, 18 accept respective wire wound coils 20, 22 of insulated copper wire or other suitable material, as represented in FIGS. 1 and 4.

Returning to FIG. 3, the stator assembly 12 has a passage 24 therethrough for receipt of a rotor assembly 26. The rotor assembly 26 of the preferred embodiment is constructed of suitable material such as a polyphenylene sulfide (PPS) plastic binder with permanent magnets of material such as neodymium iron boron, ferrite or other suitable magnetic materials known in the art. The stator assembly 12 is configured to receive a rear rotor bearing 28 and a front rotor bearing 30 to support and permit rotation of the rotor assembly 26 relative to the stator assembly 12 and about a central axis X. In this embodiment of motor 10 as a stepper motor, introduction of a current in the coil windings 20, 22 (shown in FIGS. 1 and 4) of the stator assembly 12 causes rotational movement of the rotor assembly 26. The rotor assembly 26 has a passage 32 therethrough including a threaded portion 34 for engagement with the threaded portion 36 of shaft 38 shown in FIGS. 1 and 2. Therefore, rotational motion of rotor assembly 26 is converted into linear motion of shaft 38, making this stepper motor a linear actuator. One skilled in the art will appreciate that the present invention could be utilized in various alternative embodiments of magnetic devices regardless of whether such devices are of single or multiple phase construction. Moreover, in response to an electrical input, such alternative embodiments could be constructed to provide a different output such as in a rotary stepper motor, or in a motor which provides continuous rotary motion or the like.

In the embodiment of a motor 10 used in an idle air control valve as illustrated in FIGS. 1 and 2, the shaft 38 has an integrally over-molded pintle 40 at its distal end. The pintle 40 has a sleeve portion 42 that is received within the distal end 44 of the stator assembly 12. A spring 46 is nested around the distal end of the stator assembly 12 and the sleeve portion 42 of the pintle 40. The spring 46 tends to bias the pintle 40 in an extended position. The pintle 40 receives a cylindrical grime shield 48 to protect against contamination of the motor 10.

In conjunction with the above-mentioned structures of the exemplary embodiment of a magnetic device, FIGS. 1–5 illustrate several novel and nonobvious advances over the prior art. In a first aspect of the invention, as best seen in FIGS. 1 and 2, the present embodiment employs dedicated flux return strips 50, 52 which are initially relatively flat along their length and typically constructed of low carbon steel such as AISI 1008 or 1010, or other suitable ferrous material, die formed and cut. The flux return strips 50, 52 are arranged between the respective pairs of fixed pole plates 14a–14b and 14c–14d in the stator assembly 12. Each flux return strip 50, 52 is then formed into a cylindrical shape that encircles a substantial portion of the stator assembly 12, as best seen in FIG. 4, and holds the strip in place by virtue of an interference-fit. This operation is accomplished with a machine manufactured by Philips Manufacturing Technology Center, of South Plainfield, N.J. The machine places the stator assembly 12 over the pair of flux return strips 50, 52 so that each of the respective pairs of pole plates stradles one of the flux return strips. The stator assembly 12 is then rotated as the flux return strips 50, 52 are forced between the respective pairs of pole plates 14*a*–14*b* and 14*c*–14*d* by forming wheels. The resulting interference-fit provided by this construction eliminates the need for additional compression members to hold the pole plates 14*a*–14*d* and flux return strips 50, 52 in place.

Figure 3A:
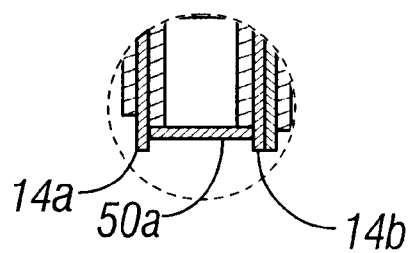

Use of an interference-fit permits many cross-sectional shapes for the flux return strips 50, 52 used in completing the stator assembly 12. For example, as shown in FIG. 3*a*, a flux return strip 50*a* could have a flat (planar) cross-section. A flat strip cross-section requires the flux return strips and the components of the stator assembly 12 to meet strict tolerances to consistently achieve an acceptable press-fit of the flux return strips between the pole plates.

Figure 3B:
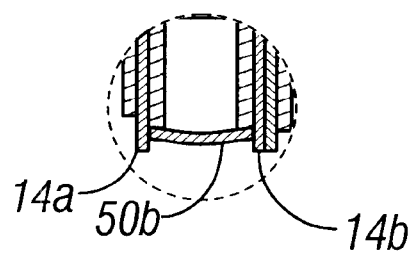

As another example of acceptable flux return strip cross-sectional shapes, FIG. 3*b* shows a flux return strip 50*b* having an arcuate cross-section. A flux return strip relatively flat along its length and having a cross-section which is arcuate or otherwise not within the same plane will tend to have its cross-section flatten and widen in the process of being placed between the pole plates and formed into a cylindrical shape around the stator assembly 12. Therefore, a flux return strip with a non-planar cross-section such as the arcuate cross-section of strip 50*b* will initially be narrower than a comparable strip with a flat (planar) cross-section such as strip 50*a* and will permit more liberal tolerances in achieving the interference-fit as it increases in width while it is being formed into its final cylindrical shape and pressed between the pole plates. However, as shown in FIG. 3*b*, by comparison to the flat cross-section of FIG. 3*a*, some nonplanar cross-sectional shapes such as the simple arcuate cross-section of strip 50*b* will result in a reduction in the potential area of contact between the edges of the flux return strip and the flat opposed surfaces of the pole plates.

Although flux return strips with flat or simple non-planar cross-sections will eliminate the need for separate compression elements to hold the pole plates and flux return strips in place, the flux return strips 50, 52 of FIGS. 1 and 2, are preferred because they combine the best attributes of both the flat and the non-planar strips. In particular, as shown in FIG. 3, the flux return strip 50 has a cross-section with a central arcuate portion, flanked by a flat leg portion along each edge. As is true of the flux return strip 50*b* of FIG. 3*b*, the arcuate portion of flux return strip 50 tends to flatten and widen when being bent to conform to the cylindrical configuration of the stator assembly 12. The arcuate portions in strips 50 and 50*b* also allow additional force to be applied to increase the width of each strip beyond that attained simply by bending the strip into a cylindrical shape. One skilled in the art will appreciate that the widening of the flux return strip, by forming around the stator assembly 12 or by subjecting the strip to additional compressive force, can be accomplished with a variety of non-planar cross-sectional strip shapes. The potential widening of flux return strips during insertion permits more lenient tolerances in the manufacture of the stator assembly and its components, such as in flux return strip width, and pole plate thickness and positioning. The structure of flux return strip 50, also seen as strips 50, 52 of FIGS. 1 and 2, includes the additional advantage of the flat outer leg portions which, during insertion into the stator assembly, are positioned with their outer edges parallel to the flat opposed surfaces of the pole plates. This flat edge to flat surface correspondence minimizes air gaps between the flux return path components. A reduction in air gaps between mating parts of a magnetic flux return path generally results in a device with better performance, i.e., higher power output for a given power input.

The construction of the stator assembly 12 with interference-fit flux return strips provides numerous benefits. First, as seen in the exemplary stepper motor embodiment, it provides a simple, cost effective, yet highly efficient way of enhancing motor performance by creating a more direct flux return path, with a reduction in potential air gaps between the components that transmit the magnetic flux. Second, certain flux return strip configurations having a cross-section with at least some non-planar portion, such as the arcuate portions seen in strips 50 and 50*b*, provide the advantageous width-increasing feature when conforming them to the configuration of the stator assembly. This additional feature permits greater dimensional tolerances and, in turn, reduces scrap and associated costs in the manufacture of such motors. Third, a motor of the present invention eliminates the need for the flux return path function of a ferrous metal motor housing. This provides improved motor performance by reducing air gaps between the elements of the flux return path while significantly reducing overall product mass.

In a further aspect of the invention, the magnetic flux return path employing flux return strips facilitates greater flexibility in product design. Elimination of the ferrous metal motor housing permits fully integrated product designs, such as the mounting of the stator and rotor assemblies within a bore of a mating component. With the example of the idle air control valve shown in FIGS. 1, 2, 4 and 5, the motor 10 may be fitted within a bore 54 of an intake manifold or throttle body 56 as depicted in FIG. 1. In light of the direct magnetic flux return path provided by the flux return strips 50, 52, the manifold 56 can be constructed of virtually any desirable material, such as plastic, aluminum or steel. The integrally mated motor 10 and manifold 56 in the exemplary embodiment are joined by use of a plastic-bodied electrical connector 58 having a groove 60 that receives an O-ring seal 62 for sealing engagement with the bore 54 of manifold 56. As best seen in FIG. 5, the electrical connector 58 has integral mounting flanges 64, 66 with through-holes 68, 70, respectively. The manifold 56 may be constructed to be combined with fasteners of virtually any desirable material and structure. By way of example, the embodiment shown in FIGS. 1, 2, 4 and 5 utilizes bolts 72, 74 which pass through holes 68, 70 in the electrical connector 58 and are received in mounting holes 76, 78 in manifold 56. The electrical leads 80 shown in FIGS. 2, 4 and 5 are connected conventionally to coil windings 20, 22 and are nested in the area of the stator assembly 12 created by the absence of complete circularity of the flux return strips 50, 52 and the pole plates 14*a*–14*d*.

One of skill in the art will appreciate that the electrical connector and bore of the mating component need not be cylindrical. Nor must the seal be of the O-ring type or common construction. Similarly it will be appreciated that the sealed mating engagement could be configured to be between an inner facing surface of the electrical connector and an outer surface of the mating component. Moreover, the mating engagement could be configured to be between other surfaces such as the surface which includes the face of the integral mounting flanges and the opposed surface on the face of the mating component.

Figure 6:
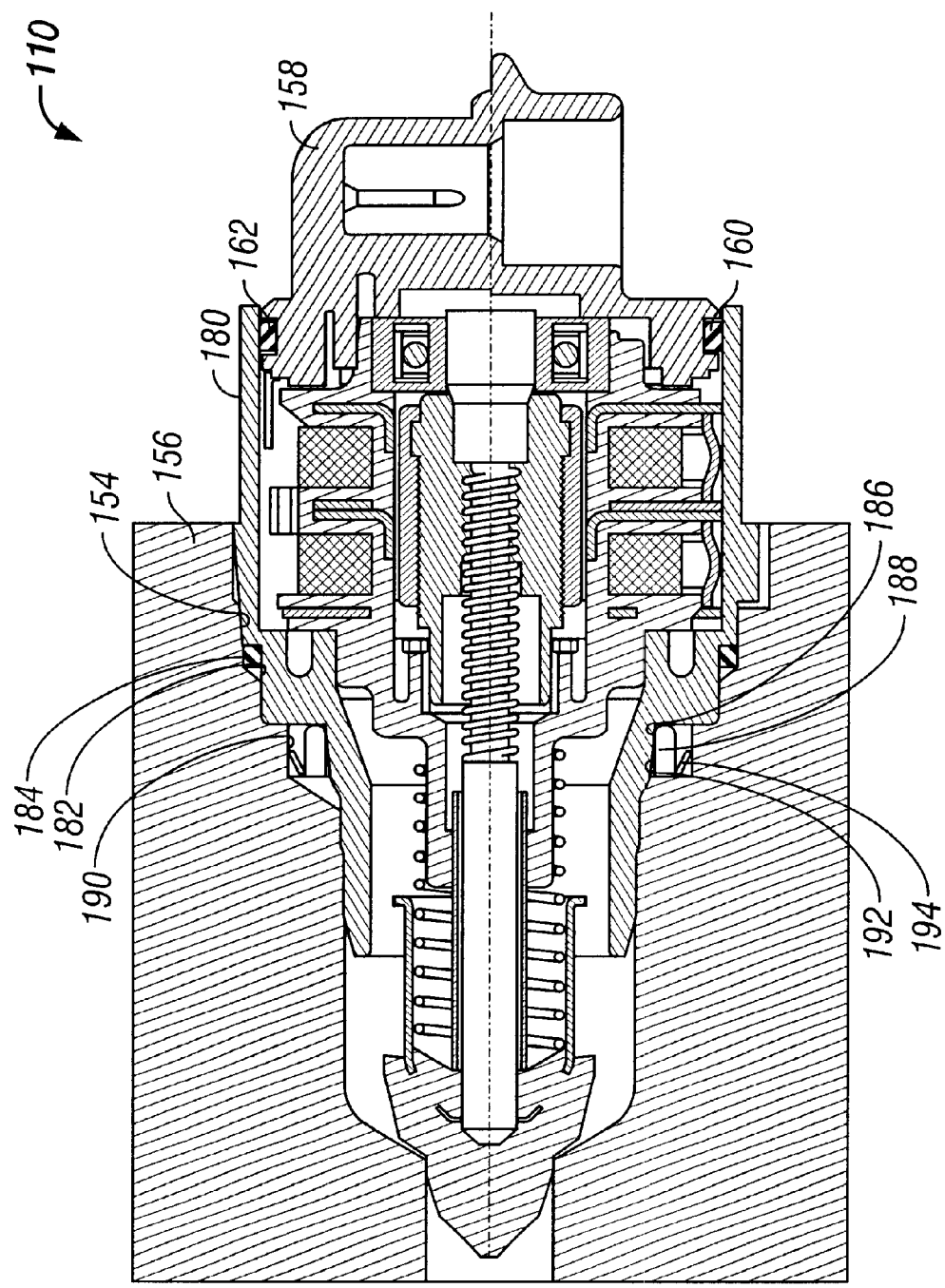
FIG. 6 is a longitudinal sectional view of an embodiment of an electric motor incorporating flux return strips, a flangeless electrical connector and a plastic motor housing for mounting of a portion of the motor within a bore of a mating component.
Figure 7:
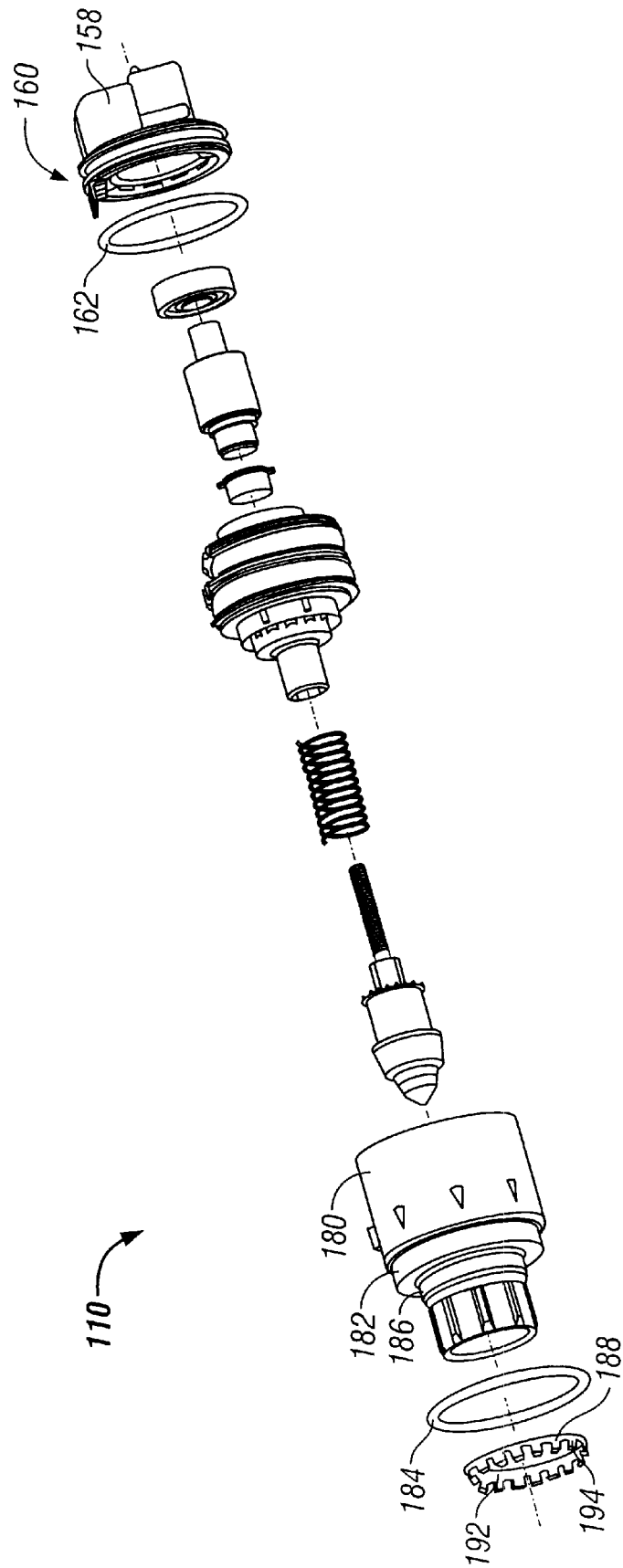
FIG. 7 is an exploded front perspective view of the electric motor shown in FIG. 6.

FIGS. 6 and 7 illustrate an alternative embodiment of a motor 1 10 employing advantages of the present invention. The internal componentry of motor 1 10 is common with that of motor 10 of the prior figures. Motor 1 10 differs from the motor 10 most notably in the structures related to housing and mounting the motor. Motor 110 has a conventional, flangeless plastic-bodied electrical connector 158. The connector 158 has a groove 160 that receives an O-ring seal 162 for sealing engagement with the interior wall of a protective motor housing 180. Using a magnetic flux return path that incorporates the aforementioned flux return strips and fixed pole plates permits the motor housing 180 of this embodiment preferably to be constructed of molded plastic, or alternatively of other suitable metallic or non-metallic materials. As noted above with respect to the first embodiment, the electrical connector and the housing can be of various shapes, configurations and constructions, and can accommodate different types of seals between various surfaces of the components.

In the second embodiment, as seen in FIGS. 6 and 7, the motor housing 180 has a landing 182 against which an O-ring seal 184 rests for sealing engagement with a bore 154 of manifold 156. As with the sealed engagement between the electrical connector and the bore of the mating component in the first exemplary embodiment, the housing, the mating component and the seal therebetween may be of various shapes, configurations and constructions to provide sealing engagement between a surface of the housing and a surface of the mating component. In the second exemplary embodiment, housing 180 also has a second landing 186 that receives a retainer 188 for retaining engagement with a second bore 190 of manifold 156. The retainer 188 has inward facing spring tabs 192 that make it self-retaining when pressed onto the landing 186 of housing 180. The retainer 188 installed on motor housing 180 also has outward facing spring tabs 194 that make it self-retaining when the motor housing 180 is pressed into the bore 190 of manifold 156. Given the self-retaining spring function of tabs 192, 194, retainer 188 is preferably constructed of suitable material such as spring steel. The construction of the retainer 188 shown in FIGS. 6 and 7 has an additional advantage in that compression of the retainer 188 upon insertion into the bore 190 causes both the inward tabs 192 and the outward tabs 194 to increase their holding force on the respective housing 180 and mating component, manifold 156. As with the prior engagements between components, one skilled in the art will appreciate that various shapes, configurations and constructions could be utilized to provide the locked engagement between a motor housing and a mating component.

The construction of the motors 10 and 1 10, without a ferrous metal motor housing and with integral mounting structures provide further numerous benefits. First, the integral mounting methods provide cost effective, lighter weight mounting systems. In FIGS. 1, 2, 4 and 5, the direct mounting of motor 10 to manifold 56 via integral flanges 64, 66 on the electrical connector 58 accomplishes sealing of the connector 58 and the motor 10 to the manifold 56 with a single seal 62. In such a mounting configuration, only the connector 58 is exposed above the mounting face of manifold 56. This minimizes the environmental exposure of the motor, simplifies the design and manufacturing, and reduces the number of parts necessary to mount and protect the motor. Second, mounting the motor 10 within the bore 54 of the manifold 56 minimizes the mass of the motor while placing the center of gravity of the motor closer to the center of gravity of the structure to which it is mounted. The lighter-weight motor with a more common center of gravity provides an improvement in the ability of the motor assembly to resist vibration. This further permits smaller, lighter-weight mounting componentry such as in the integral plastic mounting flanges 64, 66 and the fasteners 72, 74. Third, as seen more particularly with motor 110 of FIGS. 6 and 7, the reduced product mass with a non-ferrous motor housing 180 permits mounting without the additional conventional metal housing flanges and fasteners, further reducing the overall product mass in comparison to a motor having a ferrous motor housing. This, in turn, facilitates great flexibility in design of integral mounting systems.

Although, for the purpose of explanation, use of the present invention has been depicted in a bi-polar, stepper motor that provides linear actuation in an idle air control valve, it will be understood by one of skill in the art that the aspects of the invention may be embodied in a variety of advantageous constructions of magnetic devices. Also, it should be understood that any of a variety of seals and fastening mechanisms, dimensions and suitable materials of construction may be used to satisfy the particular needs and requirements of the end user. It will be apparent to those skilled in the art from consideration of the specification and practice of the invention disclosed herein that other embodiments of the invention, as well as modifications and variations of the exemplary devices depicted may be made without departing from the scope or spirit of the invention.

What is claimed is:

1. A magnetic device comprising:
   a stator assembly having a magnetic flux return path comprising at least a pair of spaced apart pole plates located a fixed distance apart from each other and having a space therebetween and at least one flux return strip pressed entirely within the space between each pair of spaced apart pole plates; and
   a rotor assembly having permanent magnetic material and being disposed for rotation relative to said stator assembly;
   wherein each flux return strip has a cross-section having an arcuate center portion between a pair of relatively flat portions.

2. A magnetic device in accordance with claim 1, wherein said stator assembly further comprises at least two pair of pole plates with each pair of pole plates being held a fixed distance apart.

3. A magnetic device in accordance with claim 1, wherein said pole plates are over-molded into said stator assembly.

4. A magnetic device in accordance with claim 1, wherein the width of the cross-section of each flux return strip is increased when the strip is formed around the stator assembly.

5. A magnetic device in accordance with claim 1, wherein the device is an electric motor.

6. A magnetic device comprising:
   a stator assembly having a magnetic flux return path including at least a pair of pole plates located a fixed distance apart from each other and at least one flux return strip, wherein at least a portion of the cross-section of the flux return strip is not flat and the width of the cross-section of the flux return strip is increased when the strip is formed around the stator assembly;
   a rotor assembly having permanent magnetic material and being disposed for rotation relative to said stator assembly; and
   wherein each flux return strip has a cross-section having an arcuate center portion between a pair of relatively flat portions.

7. A magnetic device in accordance with claim 6, wherein said stator assembly further comprises at least two pair of pole plates with each pair of pole plates being held a fixed distance apart.

8. A magnetic device in accordance with claim 6, wherein said pole plates are over-molded into said stator assembly.

9. A magnetic device in accordance with claim 6, wherein at least one flux return strip is pressed between each pair of spaced pole plates and is formed around said stator assembly.

* * * * *